United States Patent [19]

Alesso et al.

[11] Patent Number: 5,156,646
[45] Date of Patent: Oct. 20, 1992

[54] INTERCONNECTED CONTROL ARM SUSPENSION FOR A WHEEL OF A VEHICLE

[75] Inventors: Guido Alesso, Savigliano; Gian L. Perello, Strambino, both of Italy

[73] Assignee: Fiat Auto S.p.A., Turin, Italy

[21] Appl. No.: 699,388

[22] Filed: May 14, 1991

[30] Foreign Application Priority Data

May 15, 1990 [IT] Italy ................ 67353 A/90

[51] Int. Cl.⁵ ............................................. B60G 15/06
[52] U.S. Cl. ................................... 280/696; 280/692; 280/673
[58] Field of Search ............... 280/690, 691, 675, 692, 280/693, 696, 697, 698, 701, 667, 672, 673

[56] References Cited

U.S. PATENT DOCUMENTS 2,070,289  2/1937  Marmon et al. .............. 280/692
3,193,304  7/1965  Behike .
4,896,565  1/1991  Hajto .......................... 280/667

FOREIGN PATENT DOCUMENTS 312649   12/1987  European Pat. Off. .
3434636  9/1984   Fed. Rep. of Germany .
3442682  6/1986   Fed. Rep. of Germany .
522760   6/1940   United Kingdom .
2100201  5/1982   United Kingdom .

Primary Examiner—Karin L. Tyson
Attorney, Agent, or Firm—Shlesinger, Arkwright & Garvey

[57] ABSTRACT

An interconnected control arm suspension for a front wheel of a vehicle includes a hub-holder linked by way of respective fastening brackets and respective ball-joints of its own to a first and a second control arm. The first and second control arms are, in turn, cross-hinged, in accordance with a double transverse triangle configuration, to a supporting structure of the vehicle. There is a bracket hinge-linked to the lower control arm that is articulated to the upper control arm by means of a link rod. This bracket supports a body of a shock absorber having a through rod and a spring tight-mounted between a first cap borne by a first end of the rod and a second cap borne by the shock absorber body; a second end of the rod, coming out of the shock absorber body on the side opposite the first end, is hinge-linked to the supporting structure.

6 Claims, 6 Drawing Sheets

INTERCONNECTED CONTROL ARM SUSPENSION FOR A WHEEL OF A VEHICLE

BACKGROUND OF THE INVENTION

The present invention relates to an interconnected control arm-type suspension suited to being used for the front wheels of a vehicle, in the case in point a motor vehicle.

Double transverse triangle suspensions are well known, which resort to a hub holder rising vertically and connected to a short upper arm. Such architecture has yielded a geometry with a substantially neutral behavior, while reducing the distance between the steering axis and a plane going through the wheel center line.

In comparison with a traditional "MacPherson"-type suspension the profile of the bonnet is lower, the spring-shock absorber set being directly fastened to the body. However, this solution does not lend itself to a completely automated assembly of the suspension.

SUMMARY OF THE INVENTION

The object of the invention is to provide a transverse quadrilateral suspension for a vehicle wheel with the spring-shock absorber set not linked to the body in the traditional way; that is to say, which can be directly linked to the suspension supporting frame so as to allow pre-assembly off the line and subsequent fitting of the vehicle body on the assembly line. This object is achieved according to the invention which relates to an interconnected control arm suspension for a wheel of a vehicle. In the present invention a hub holder is fastened, by means of respective fastening brackets and respective articulation devices of its own, to a first and a second control arm, disposed respectively superior and inferior relative to each other. The first and second control arms are, in turn, cross-hinged to a supporting structure of the vehicle according to a double transverse triangle configuration. In the present invention, a bracket is hinge-linked to said lower control arm. In turn, the bracket is articulated to the upper control arm by means of a link rod. The bracket supports a spring-shock absorber set comprising a hollow body rigidly supported by the bracket, and a sliding rod fitted in and extending through the hollow body, so that a first and a second opposite end of the sliding rod extend out of respective opposite ends of the hollow body. There is a spring pack-fitted between a first cap supported by the first end of the rod and a second cap supported by the hollow body of the shock absorber. The second end of the rod is hinge-linked to the supporting structure of the vehicle.

BRIEF DESCRIPTION OF THE DRAWINGS

The invention will be more apparent from the non-limiting description of an embodiment thereof given hereinafter, by way of example, with reference to the accompanying drawings, in which.

DETAILED DESCRIPTION OF THE INVENTION

Figure 1:
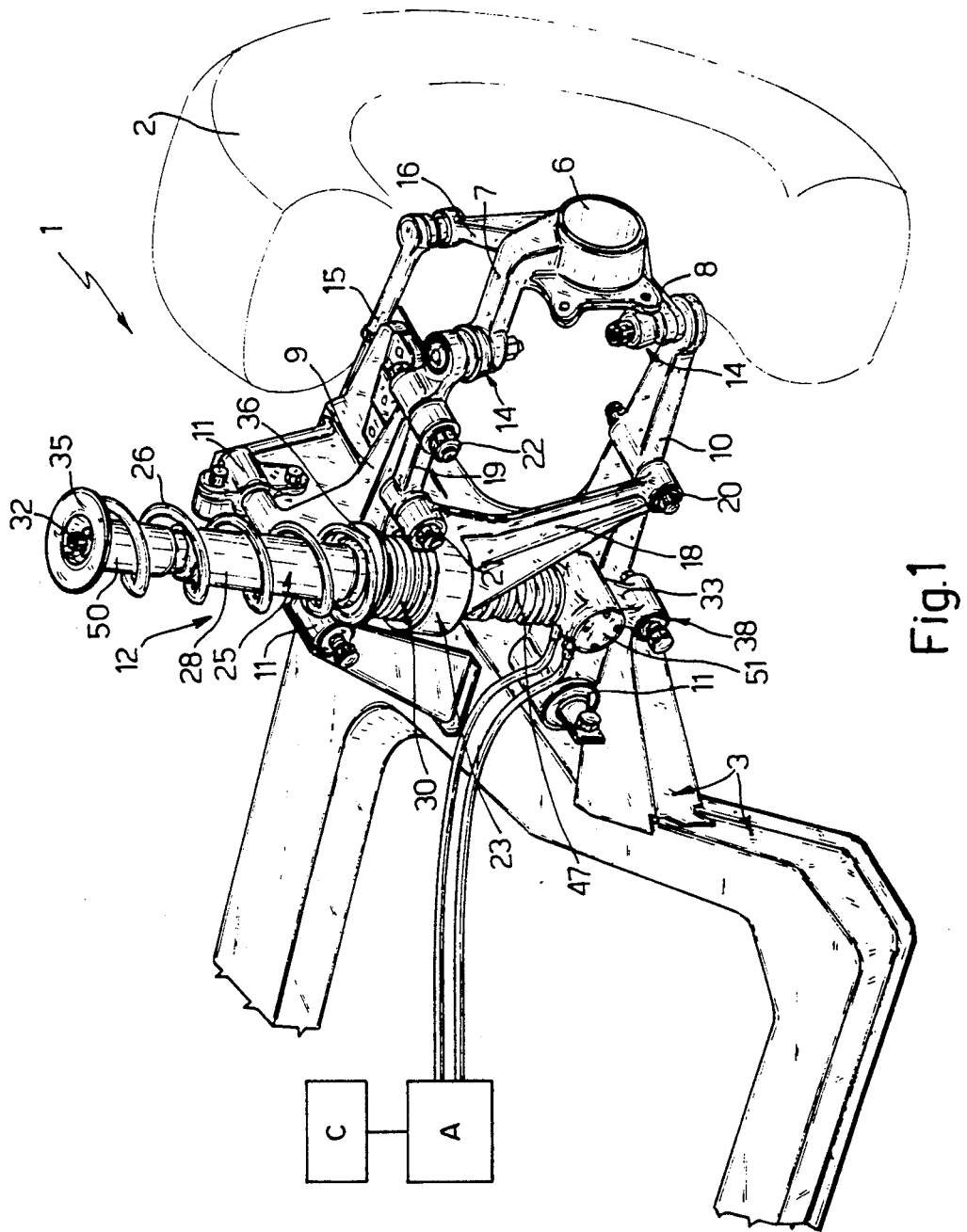
FIG. 1 is a perspective view of a suspension constructed according to the invention.
Figure 2:
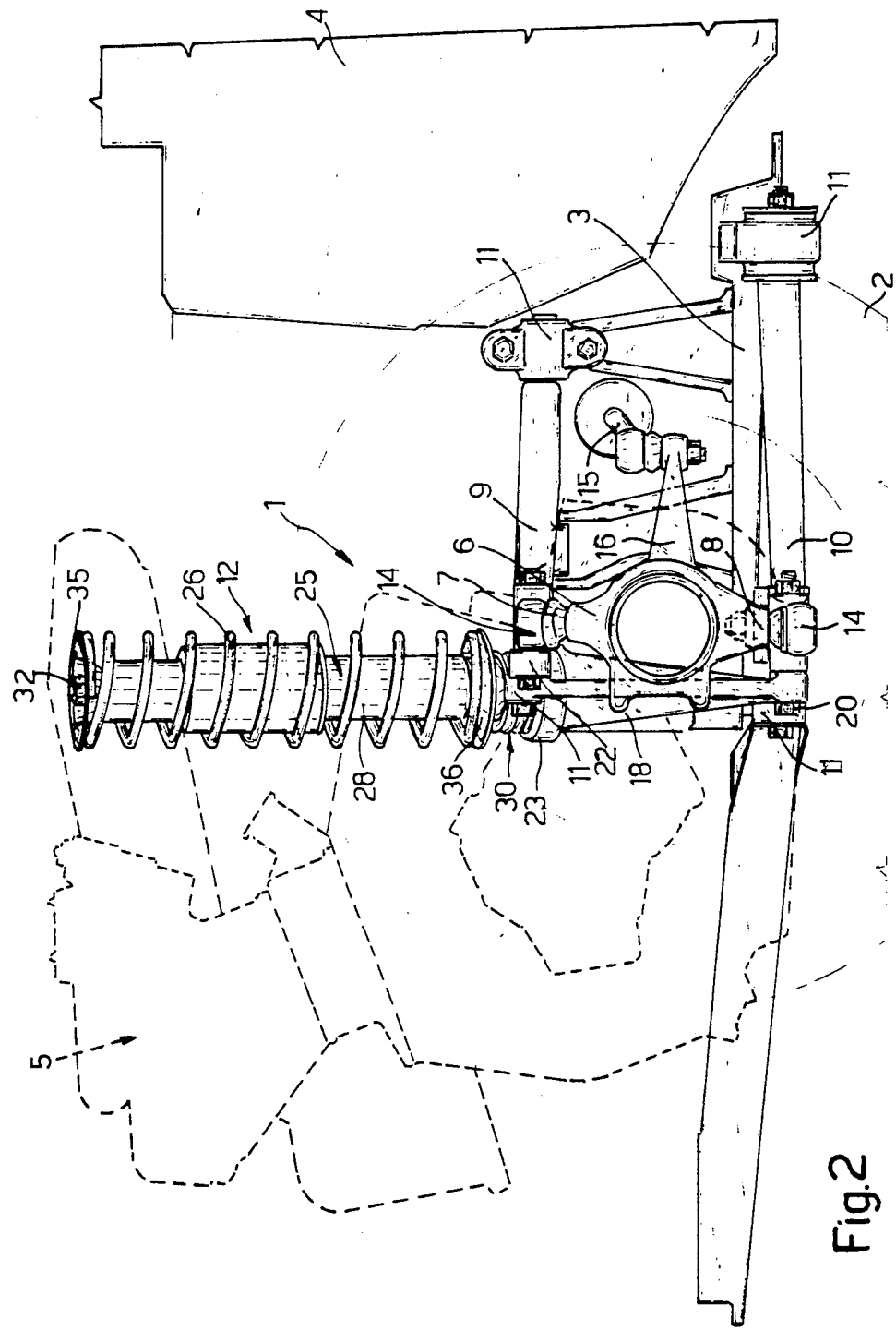
FIGS. 2, 3, and 4 are, respectively, a longitudinal front view, a transverse front view, and a top, plan view of the suspension of FIG. 1.
Figure 3:
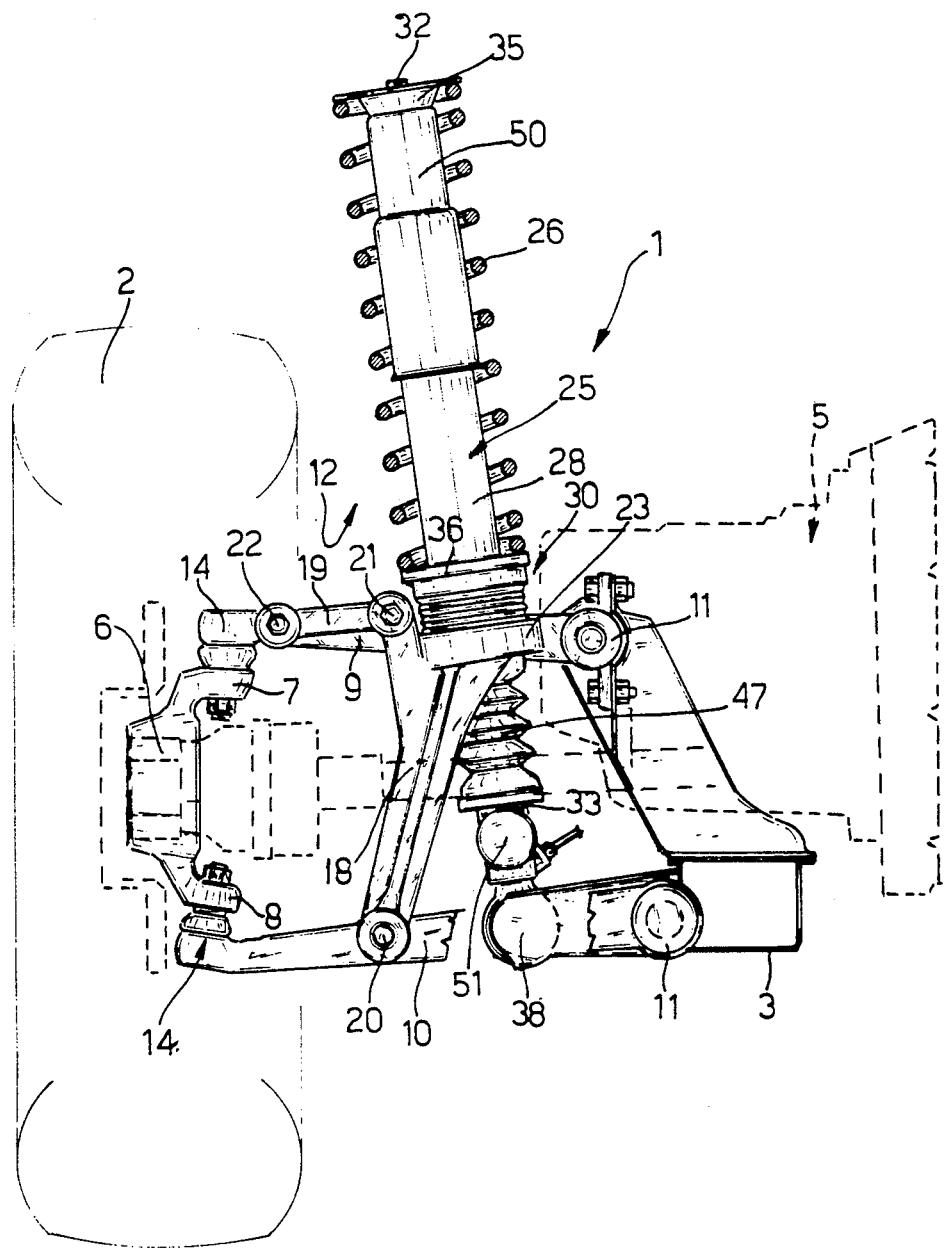
Figure 4:
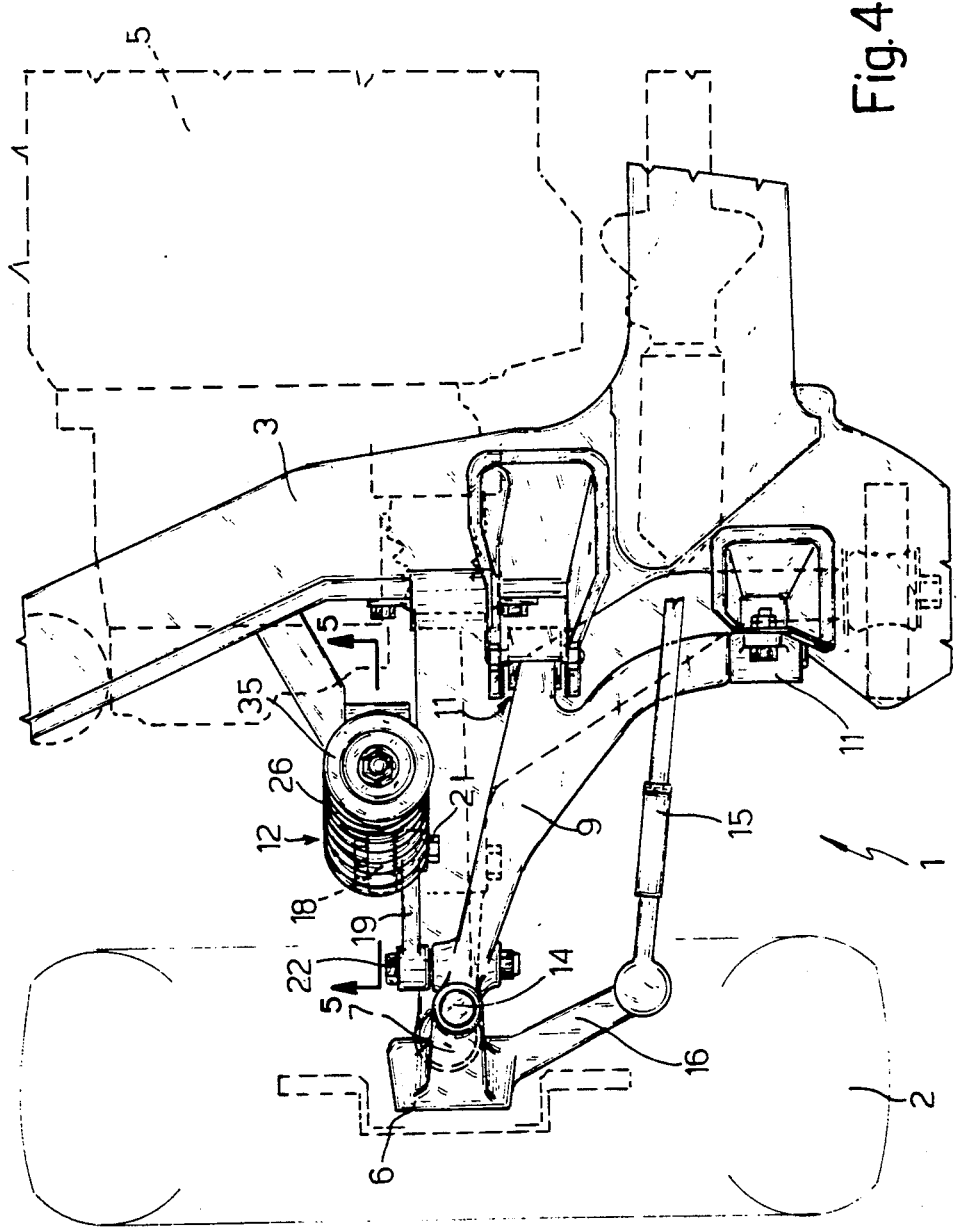

In FIGS. 1 to 4 reference numeral 1 indicates generally a suspension for supporting a wheel 2 of a vehicle, in particular for supporting a front wheel of a motor vehicle of a well-known type and, therefore, of which there is only illustrated a portion of a body 4 (FIG. 2) for simplicity. In the case in point, a supporting structure defined by an auxiliary frame 3 configured to receive more mounted suspensions 1; i.e., the two front suspensions of the vehicle, one per side, and a well-known engine 5 (FIG. 3; and shown in broken lines in FIGS. 2 and 4 for clarity) of the vehicle itself.

In particular, suspension 1 is an interconnected control arm-type suspension having a transverse quadrilateral structure and comprises a well-known hub holder 6, provided with respective fastening brackets 7 and 8, for supporting the hub of the wheel 2, well-known and shown in phantom lines for simplicity, a pair of well known, first and second control arms 9 and 10, respectively, superior and inferior (e.g., above and below each other, respectively), cross-hinged on auxiliary frame 3 by means of respective, well-known spring buffers 11, in accordance with a well-known double transverse triangle configuration, and a spring-shock absorber set 12.

Control arms 9 and 10 support hub holder 6 through brackets 7 and 8 to which they are linked by means of respective, well-known ball joints so that, in the direction transverse relative to the vehicle, the structure made up of frame 3, control arms 9 and 10 and hub holder 6 behaves as an articulated quadrilateral, and so that the hub holder 6 is simultaneously free to rotate, under the thrust of a steering gear rod 15 hinged to another bracket 16 of hub holder 6, about the axis joining joints 14 of brackets 7, 8 to steer front wheel 2 in the direction determined by the direction of translation of steering gear rod 15.

According to the invention, a bracket 18 is hinge-linked to the two control arms 9 and 10. Bracket 18 supports, together with frame 3, spring-shock absorber set 12 and joins, together with a link rod 19, control arms 9 and 10 in an articulated manner. More particularly bracket 18 is hinge-linked, at the bottom, directly to control arm 10 by means of an articulation pin 20 and, at the top, it is linked, in an articulated manner, to control arm 9, precisely through link rod 19. Link rod 19 is hinge-linked at opposite ends: on one end to bracket 18 by means of a first articulation pin 21 and on the other end to control arm 9 by means of a second articulation pin 22. Level with pin 21 bracket 18 presents, laterally cantilevered, a cup seat 23 through which there is fitted spring-shock absorber set 12.

Figure 5:
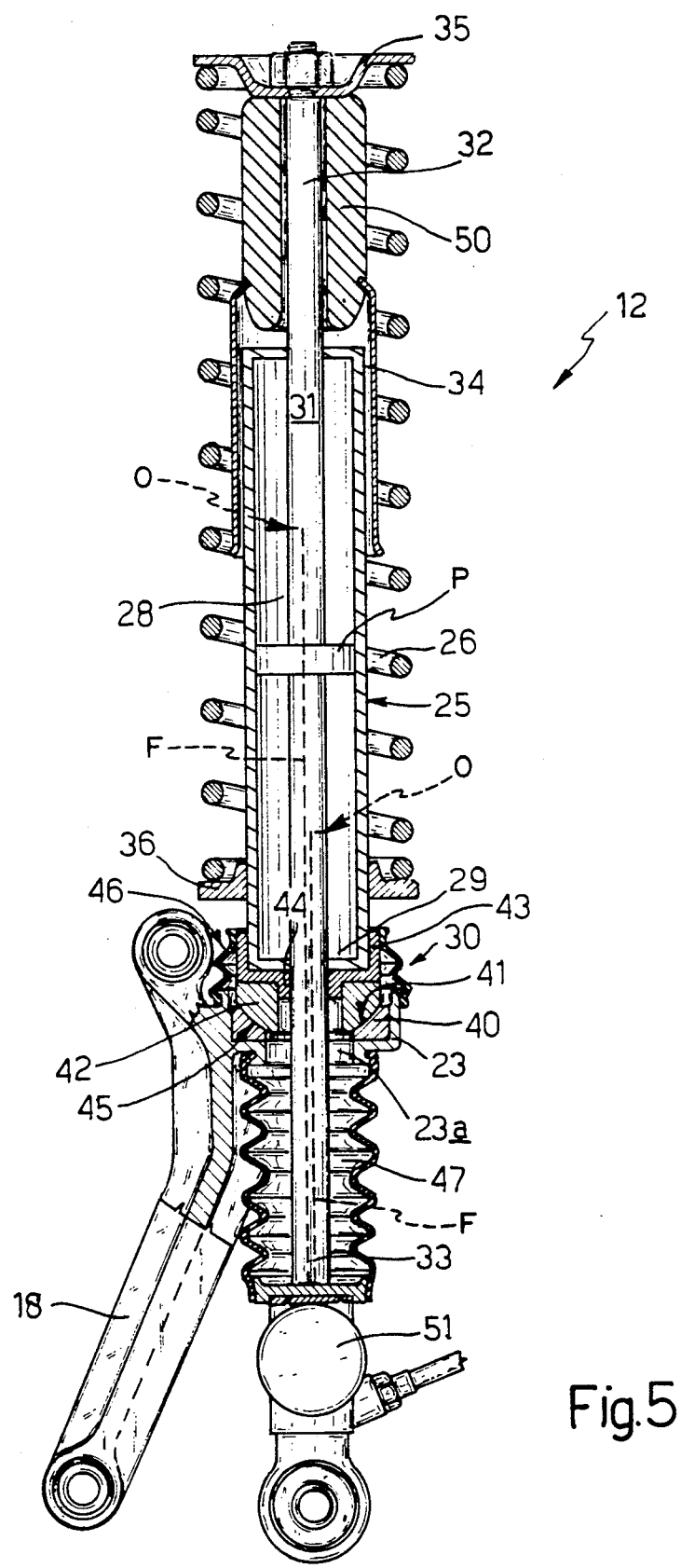
FIG. 5 is a partial, sectional view taken along section line 5—5 of FIG. 4 on an enlarged scale, of an element of the suspension of FIG. 1.
Figure 6:
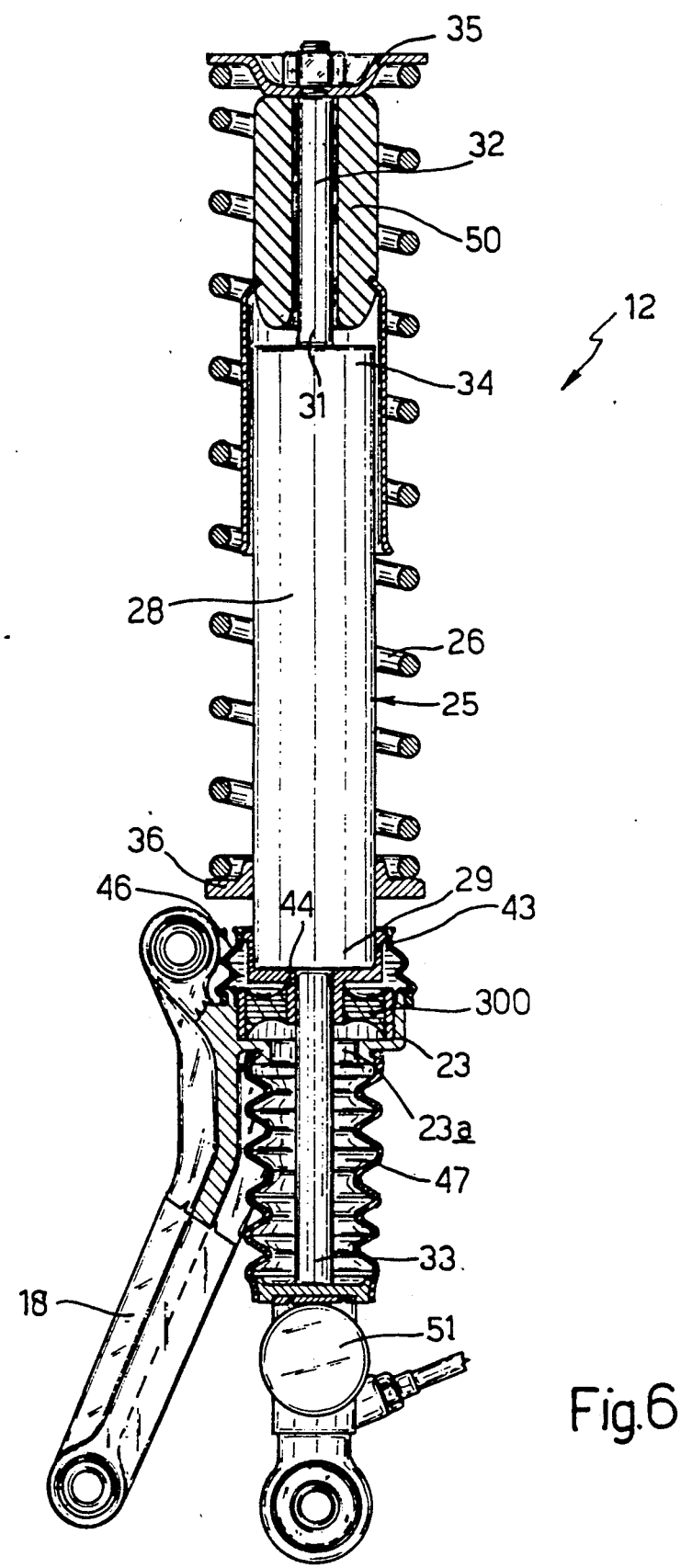
FIG. 6 illustrates a different embodiment of the element of FIG. 5.

In FIGS. 5 and 6, which illustrate, on an enlarged scale, a detail of bracket 18 (as viewed in FIG. 4) with, as mounted, two different embodiments of spring-shock absorber set 12. Set 12 comprises a hydraulic shock absorber 25 and a helical spring 26 mounted coaxially on an outer face of shock absorber 25. In particular, shock absorber 25 comprises a hollow body 28 rigidly carried by bracket 18 (by means of a ball joint pad 30, as shown in the embodiment of FIG. 5, or by means of a spring buffer 300 performing the same functions as ball joint pad 30 as shown in the embodiment of FIG. 6).

Hollow body 28 is supported by bracket 18 at a lower end 29 of body 28, which is inserted into cup seat 23, and a sliding rod 31 is fluid-tightly fitted through cup hollow body 28 so that a first and a second opposite ends at rod 31, respectively indicated by 32 and 33, extend axially cantilevered out of respective opposite ends of hollow body 28, in this case out of an upper end 34 and out of lower end 29 of hollow body 28. At lower end 29, cup seat 23 of bracket 18 includes an aperture 23a enabling rod 31 to extend through bracket 18, thereby enabling second end 33 of rod 31 to be linked to frame 3.

Spring 26 is mounted coaxially with rod 31 and with hollow body 28. Spring 26 is pack-tightened, with a predetermined preload, between a cap 35, supported by upper end 32 of rod 31, and a second cap 36 fixed on the outer face of hollow body 28, just a little above lower end 29, for example, by being welded or caulked onto body 28. Shock absorber 25 is hinge-linked to the bearing structure of the vehicle, in the case in point, to auxiliary frame 3, by means of an articulation pin 38 disposed substantially parallel to pins 20 and 22 and linking end 33 of rod 31 to frame 3. In that way spring-shock absorber set 12 is mounted in a rocking manner on frame 3, with the possibility of oscillations on pin 38 according to a trajectory followed by bracket 18 during the rebound phases of suspension 1 resulting from motion of the vehicle on which it is mounted.

In order to allow such rocking motion, ball joint pad 30 (FIG. 5) comprises a first collar step bearing 40 fixed inside cup seat 23 and presenting, inside, a ring-shaped track 41 delimited by a spherical surface, and a second collar step bearing 42. Collar step bearing 42 is, on the one hand, mounted fixedly relative to a bowl 43 (in that case driven on top of a collar 44 of bowl 43), which, in turn, is fixedly mounted relative to hollow body 28, and driven onto lower end 29 of hollow body 28. On the other hand, collar step bearing 42 is delimited by a convex hemispherical surface 45 mated with track 41 and cooperating with it. Protective bellows 46 are mounted between cup seat 23 and bowl 43 to protect collar step bearings 40, 42 and, on the opposite side, other bellows 47 are mounted between seat 23 and second end 33 for protecting rod 31.

The stroke of rod 31 is limited by a travel bumper 50 made of an elastomer that is mounted on first end 32 of rod 31, abutting against first cap 35, and arranged to engage in an abutting manner against upper end 34 of hollow body 28. Preferably, moreover, shock absorber 25 is of the "intelligent" type, as we call it; that is to say, it includes a real electronic control hydraulic actuator A which is controlled in a well-known manner by a computer C, shown schematically for simplicity, through a well-known feed device 51 for a pressurized fluid (typically oil) within hollow body 28. Feed device 51 is, in this case, provided fixed with respect to end 33 of rod 31. For example, rod 31 may feed device 51 by means of known openings O. By the regulation of the pressure of a pressurized fluid against a known piston P (shown schematically for simplicity) rod 31 and hollow body 28 can be moved relative to each other by well-known feed device 51.

OPERATION

In use, in suspension 1 as described above, the oscillations originating from spring-shock absorber 12 all directly unload on auxiliary frame 3 through articulation pin 38, as a vertical load is transmitted through bracket 18 (which is hinged on lower control arm 10) to hollow body 28 and, therefore, the vertical load is transmitted to second cap 36 on which spring 26 rests. Consequently, the vertical load is transmitted to first cap 35, which acts as a reaction cap, the vertical load thus being transmitted to rod 31 and thence to frame 3 to which second end 33 is fastened. During the rebound phases the trajectory described by seat 23 of bracket 18 and, consequently, the amplitude of the rocking motion of the spring-shock absorber set 12 on pin 38, are a function of the hinging position of the ends of link rod 19.

Actually, by modifying the positions of pins 20, 22 it is possible to reduce nearly to zero the oscillation of spring-shock absorber set 12. In any case, such oscillation is quite foreseeable during the development phase, which is why the positions of pins 20, 22 can be optimized according to the type of vehicle on which suspension 1 is mounted.

The advantages of the invention are apparent from the foregoing description. Such advantages include: suspension 1 is very easy to mount on body 4 and does not weigh on the structure as the top of spring-shock absorber set 12 does not have to be linked to the body itself. Additionally, the overall height of the suspension described is much lower than that of a suspension of the "MacPherson" type, which is why a vehicle in which it is installed can be built with a lower profile.

We claim:

1. Interconnected control arm suspension for a wheel of a vehicle, comprising:
  a) a lower control arm;
  b) a bracket pivotably connected to said lower control arm;
  c) an upper control arm;
  d) a link rod means articulatedly attached to said bracket and to said upper control arm;
  e) a spring-shock absorber supported by said bracket, said spring-shock absorber including:
    i) a hollow body having first and second spaced opposed ends and being rigidly supported by said bracket;
    ii) a sliding rod having first and second spaced opposed ends and being fitted through said hollow body;
    iii) said first and second ends of said sliding rod extending out of said first and second ends of said hollow body, respectively;
    iv) a first cap disposed on said first end of said rod;
    v) a second cap disposed on said hollow body; and
    vi) a spring disposed and preloaded between said first and second caps; and
  f) linking means for pivotably connecting said second end of said rod to a supporting structure of a vehicle.

2. A suspension as defined in claim 1, wherein:
  a) a ball joint pad is disposed on said bracket; and
  b) said ball joint pad supports a lower one of said first and second ends of said hollow body.

3. A suspension as defined in claim 1, wherein:
  a) a spring buffer is disposed on said bracket; and
  b) said spring buffer supports a lower one of said first and second ends of said hollow body.

4. A suspension as defined in claim 1, wherein:
  a) said spring comprises a helical spring mounted coaxially with respect to said rod and to said hollow body;
  b) an elastomer bumper is disposed at said first end of said rod and is abutted against said first cap; and c) said elastomer bumper is configured for engaging an upper one of said first and second ends of said hollow body for limiting a stroke of said rod.

5. A suspension as defined in claim 1, wherein:

a) a feed device for feeding a pressurized fluid is disposed at said second end of said rod for controlling a pressurized fluid in said hollow body.

6. A suspension as defined in claim 1, wherein:

a) said support structure comprises an auxiliary frame which supports an engine of a vehicle.

* * * * *